United States Patent [19]

Floyd

[11] B 4,001,194

[45] Jan. 4, 1977

[54] PROCESS FOR POLYMERIZING METALLOCENES

[75] Inventor: F. Louis Floyd, Strongsville, Ohio

[73] Assignee: SCM Corporation, Cleveland, Ohio

[22] Filed: Nov. 11, 1974

[21] Appl. No.: 522,446

[44] Published under the second Trial Voluntary Protest Program on March 30, 1976 as document No. B 522,446.

[52] U.S. Cl. .............................. 526/240; 526/209; 526/210; 526/225; 526/317; 526/328; 526/331; 526/347

[51] Int. Cl.$^2$ ......................................... C08F 30/04

[58] Field of Search ............ 260/80 P, 80 M, 80 C, 260/80.71

[56] References Cited

UNITED STATES PATENTS

| | | | |
|---|---|---|---|
| 3,063,974 | 11/1962 | Pruett | 260/80 |
| 3,238,185 | 3/1966 | Neuse | 260/80 M |
| 3,350,369 | 10/1967 | Rosenberg | 260/80 P |
| 3,560,429 | 2/1971 | Bilow | 260/80 P |
| 3,847,871 | 11/1974 | Stephens | 260/80 P |

OTHER PUBLICATIONS

Kuwana et al., Chronopotentiometric Studies on the Oxidation of Ferrocene, Ruthenocene, Osmocene, and Some of Their Derivatives, J. Am. Chem. Soc., 82(22), pp. 5811–5817, 1960.

*Primary Examiner*—Paul R. Michl
*Attorney, Agent, or Firm*—S. I. Khayat; Merton H. Douthitt

[57] ABSTRACT

Metallocene that is polymerizable by free radical catalysis and has metal nucleus in a state of oxidation below its maximum can be polymerized without oxidation of such nucleus by forming a reaction mixture containing said metallocene and the reducing agent of a redox catalyst combination, then initiating and maintaining polymerization of said metallocene with the gradual addition of the oxidizing agent of said combination to said reaction mixture.

5 Claims, No Drawings

PROCESS FOR POLYMERIZING METALLOCENES

This invention relates to an improvement in process for polymerizing a metallocene compound that is polymerizable by free radical polymerization, and more particularly to such improvement wherein the metal nucleus of such compound is in a state of oxidation below its maximum.

Heretofore polymerization of such metallocenes, e.g. vinyl ferrocene, has been initiated using a non-peroxide initiator such as an azo compound. This restriction was necessary because the metal nucleus of the metallocene was oxidized by the peroxide or by the oxidizing agent of the redox catalyst system. The initiation system then preferred was azobisisobutyronitrile or other azo compound.

Advantages of the instant improvement include the ability to use redox catalyst systems including peroxy catalysts with attendant efficiency and economy.

The instant improvement for suppressing oxidation of the metal nucleus of such metallocene comprises:
 forming a reaction mixture containing said metallocene and the reducing agent of a redox catalyst combination;
 then initiating and maintaining polymerization of said metallocene with the gradual addition of the oxidizing agent of said combination to said reaction mixture.

The broad types of polymerizations possible in connection with this invention include emulsion polymerization in water, solution polymerization in suitable organic solvents, suspension polymerization in water or non-aqueous media, and bulk polymerizations. Naturally when water is present in the reaction mixture hydrolyzable linkages such as ester linkages (as in a ferrocene acrylate) should be avoided.

Gradual addition of the oxidizing agent includes incremental, periodic, or continuous addition of such agent during the polymerization process, without creating more than the most transitory excess of the oxidizing agent until the polymerization is at least substantially complete.

The metallocene most often is a monomer but can be an oligomer or a prepolymer capable of further polymerization. Copolymerizations and interpolymerizations with other addition polymerizable substances (such as vinyl and acrylic compounds whether metallocene or not) also can be practiced. Typical constituents on the metallocene which make it homopolymerize or copolymerize are the groups vinyl, acrylic, allylic, dienyl, maleate and other groups having carbon-carbon unsaturation of broadly the following type:
 $>C=C<$. Acetylenic substitution also is possible for such polymerizations.

Three types of metallocenes are known: (1) dicyclopentadienyl metals of the general formula $(C_5H_5)_2M$; (2) dicyclopentadienyl metal halides of the general formula $(C_5H_5)_2MX_{1-3}$; and (3) monocyclopentadienyl metal compounds of the general formula $C_5H_5MR_{1-3}$ where R is CO, NO, halide, alkyl group, and the like; and M represents the metal nucleus of any of the foregoing metallocene types. One or both of the cyclopentadienyl structures can be substituted to form an indenyl radical which itself is substituted with a polymerizable group such as vinyl. The cyclopentadienyl or like groups can also be joined in hinge-like bond between a carbon atom of each of them.

As mentioned before, the metal nucleus in the metallocene compound is in a state of oxidation below its maximum, thus capable of further oxidation; e.g. ferrous to ferric in ferrocene as distinguished from titanocene compounds and the like wherein the residual valences of + +4 are satisfied by ions such as chloride ions. The most common metal nucleus, and the most economical for study is ferrous iron, and the monomer fed to such polymerization is vinyl ferrocene. Examples of other metal nuclei include nickel + 2, V + 4, Mn + 2, chromium + 2, making nickelacene, vanadacene, manganacene, chromacene and the like. Cobaltocene is obviated because it is known to inhibit the polymerization of olefins and diolefins up to 200°C.

Typical reducing agents for conventional redox systems include alkali metal and ammonium metal bisulfites, alkali metal sulfoxolate formaldehyde ("Formopon" a trademark of Rohm & Haas Co.), ferrous chloride, alkali metal bisulfite, alkali metal hydrosulfite ("Lykopon" a trademark of Rohm & Haas Co.), alkali metal thiosulfate, ferrous sulfate, and ferrous ammonium sulfate. Typical oxidizing agents for such redox combination include t-butylhydro-peroxide, benzoyl peroxide, hydrogen peroxide, and alkali metal and ammonium persulfate. Conventional redox systems are contemplated for use in this invention.

The polymerization ordinarily is conducted with mechanical agitation at a temperature broadly between 0° and 90° Centigrade and at atmospheric pressure, although subatmospheric pressure or superatmospheric pressure up to about 10,000 psig can be used. For conservation of volatile materials it is conventional in such polymerizations to use a vent condenser (atmospheric pressure) for recycling readily condensible materials to the reaction mixture. The proportion of reducing and oxidizing agents used are essentially matched, using about 0.005 to 0.020 mols and preferably 0.01 to 0.015 mols of oxidizing agent per mol of polymerizable reactant and an equivalent proportion of reducing agent. The latter is charged in excess at the initiation of the reaction, preferably all of it being present in the agitated reaction mixture when the oxidizing agent flow is commenced. Materials of construction commonly are glass, glass-lined metal, and other common corrosion-resisting materials.

The polymer products from the inventive operation are useful generally in the manner of their non-metallocene analogs, and they can have special utility for photochemical operations such as photopolymerization or photodegradation.

The following examples show ways in which this invention can be practiced, but should not be construed as limiting the same. In this specification all parts are parts by weight, all percentages are weight percentages, and all temperatures are in degrees Centigrade unless otherwise expressly noted.

EXAMPLE 1

Polymerization is conducted in a glass reactor at atmospheric pressure, the reactor being equipped with an agitator, heat transfer means, nitrogen purge, and a water-cooled reflux condenser overhead. 1312 Parts of deionized water, 49.6 parts of sodium diamyl sulfosuccinate ("Aerosol AY-65, 65%—a trademark of American Cyanamid Company), and 16 parts of sodium sulfoxylate formaldehyde ("Formapon", a trademark of the Rohm & Haas Company) is charged into the reactor with nitrogen purge and heated to 60 °± 1°. In a separate vessel 856 parts of styrene, 832 parts of butyl acrylate, 32 parts of methacrylic acid, and 80 parts of vinyl ferrocene are mixed and emulsified as a mixture into 720 parts of deionized water and 22.4 parts of octyphenol polyethoxy ethanol having an average of 40 ethylene oxide units per molecule ("Triton" X-405, 70%—a trademark of Rohm & Haas Company) by slowly adding this monomer mixture to the vigorously agitated aqueous mixture in said separate vessel while purging it with nitrogen.

10% Of the resulting monomer emulsion is added to the reactor that has thoroughly been purged with nitrogen, and the resulting mixture is stirred for 5 minutes.

In a further separate vessel a mixture of 22.4 parts of tertiary-butyl hydroperoxide (70%-a product of the Lucidol Division of Pennwalt Corporation) and 400 parts of deionized water is made up with agitation as the oxidizing agent of the redox combination and kept purged with nitrogen.

10 % Of the oxidizing agent mixture is added to initiate polymerization, then the monomer emulsion is gradually added continuously over a period of 2 hours while agitating the reacting mixture as it is being purged with nitrogen. Concurrently with this, the oxidizing agent mixture is added in 10% increments during said 2-hour period frequently enough to substantially maintain some exothermic heat of reaction. The reaction is maintained at a minimum of 60°, with the exothermic heat of reaction allowed to dissipate, this being less than a 10° temperature rise. At the completion of the run the resulting aqueous latex is cooled to room temperature, neutralized to pH 9.0–9.5 with concentrated aqueous ammonia (28°Baume), then filtered.

The resulting product emulsion has pH of 9.35, viscosity of 11 centipoises (Brookfield Model LVT, No. 1 spindle, 60 rpm), 1.026 grams per cc, and solids (non-volatile matter) content of 41.8% by weight. Conversion of the reactant is essentially 100% with negligible coagulum present. The weight average particle size was determined to be 1050 A as measured by the technique described by Mann, Pierce, and Ulevitch in *J. Colloid Sci.*, 18, 470 (1963) The glass transition was calculated to be 3°C. by the equation $$\frac{1}{T_p} = \Sigma \frac{Wi}{Ti}$$

where $T_p$ = glass transition temperature of the copolymer in degrees Kelvin, $T_i$ = glass transition temperature of the homopolymer for each monomer present in the copolymer, also in degrees Kelvin, and $Wi$ is the weight fraction of each monomer present in the copolymer.

No evidence of iron oxidation was noted during the polymerization.

EXAMPLES 2–5

The table below summarizes polymerizations which are made in the same manner as Example 1, except where otherwise indicated. All these systems are processed without difficulty and carried to essentially 100% conversion within 2–3 hours. No oxidation of the metal is observed, nor are there any significant conversion rate differences among the five systems.

In the table, the following abbreviations BA, S, MAA, VFe, and N.V. denote butyl acrylate, styrene, methacrylic acid, vinyl ferrocene, and non-volatiles, respectively.

TABLE I

| Ex. | Composition | | | | % N.V. | pH | Vis. (cps) | Particle Dia. A | Latex Color |
| --- | --- | --- | --- | --- | --- | --- | --- | --- | --- |
| | BA | S | MMA | VFe. | | | | | |
| 1 | 52 | 41 | 2 | 5 | 41.8 | 9.35 | 11 | 1850 | med. yellow |
| 2 | 52 | 46 | 2 | 0 | 39.7 | 9.26 | 11 | 1400 | milky white |
| 3 | 52 | 45 | 2 | 1 | 38.9 | 9.35 | 10 | 1300 | pale yellow |
| 4 | 52 | 46 | 2 | a | 39.2 | 9.22 | 11 | 1600 | pale yellow |
| 5 | 52 | 46 | 2 | b | 32.7 | 9.20 | 11 | 1400 | med. yellow | a, 1% ferrocene incorporated in monomer mix; styrene level not adjusted.
b, 5% ferrocene incorporated in monomer mix; styrene level not adjusted.

Oxidation of the metal nucleus from oxidation state II to state III takes place in the presence of excess oxidizing agent. Such reaction is detected easily during emulsion polymerization by the change in color from pale yellow to pale muddy green. If this condition is reversed promptly with reducing agent, no irreversible reactions appear to occur.

Example 2 demonstrates a non-ferrocene containing analog polymer prepared for reference. Example 3 is an analog of the previously described Example 1, but containing only 1% by weight of vinyl ferrocene in the monomer mix. Examples 4 and 5 demonstrate that ferrocene itself can be successfully incorporated into a polymer as an additive without being copolymerized through a vinyl substituent. Over a period of several months, however, the ferrocene additive tended to migrate out of the polymer and crystallize on the walls and bottom of the storage vessel in which the emulsions were contained. Thus Examples 4 and 5 represent less desirable applications of the present invention.

Chromatographic and other analysis verify that true polymers are formed by the polymerizable metallocene in accordance with the principles of this invention.

I claim:

1. In a process for the polymerization of a metallocene compound that is polymerizable by free radical polymerization and has a metal nucleus in a state of oxidation below maximum, the improvement for suppressing oxidation of the metal nucleus of said metallocene which comprises:

forming a reaction mixture containing said metallocene and the reducing agent of a redox catalyst combination;

then initiating and maintaining polymerization of said metallocene with the gradual addition of the oxidizing agent of said combination to said reaction mixture.

2. The process of claim 1 wherein the metallocene is polymerizable by virtue of vinyl substitution.

3. The process of claim 1 wherein the metallocene is a substituted ferrocene.

4. The process of claim 3 wherein the metallocene is vinyl ferrocene.

5. The process of claim 1 wherein the resulting polymer is made by emulsion polymerization.

* * * * *